United States Patent [19]

Bourcier de Caron de Previnquieres

[11] 4,262,723

[45] Apr. 21, 1981

[54] REMOVABLE, NON-SKID TIRE FITTING

[76] Inventor: Alain J. M. Bourcier de Caron de Prévinquieres, 6, Blvd. Victor Hugo, 06 000 Nice, France

[21] Appl. No.: 962,157

[22] Filed: Nov. 20, 1978

[30] Foreign Application Priority Data

| Nov. 21, 1977 | [FR] | France | 77 35964 |
| Jun. 5, 1978 | [FR] | France | 78 17695 |
| Jun. 29, 1978 | [FR] | France | 78 20114 |

[51] Int. Cl.³ ............................................. B60C 27/00
[52] U.S. Cl. ....................................... 152/222; 152/210
[58] Field of Search ................. 152/222, 221, 210; 238/14; 180/16; 301/43; 305/19; 428/119, 120, 425.8, 457, 472

[56] References Cited

U.S. PATENT DOCUMENTS

| 2,632,491 | 3/1953 | Eisner | 152/222 |
| 3,118,481 | 1/1964 | Braudorn | 152/222 |
| 3,757,841 | 9/1973 | Cantz | 152/210 |
| 3,951,194 | 4/1976 | de Previnquieres | 152/221 |
| 4,036,273 | 7/1977 | Kemper | 152/222 X |
| 4,171,718 | 10/1979 | Walrave et al. | 152/222 |

FOREIGN PATENT DOCUMENTS 2278513 2/1976 France.
2313220 12/1976 France.
2372041 12/1976 France.

*Primary Examiner*—William A. Powell
*Assistant Examiner*—Thomas E. Bokan
*Attorney, Agent, or Firm*—Darby & Darby

[57] ABSTRACT

A removable, non-skid tire fitting for use in snow and ice which includes a number of shoes on chains which are to be attached to the tire. Each shoe is of plastic material and is formed with a plurality of bosses in which flanged studs are located, the flange aiding to retain a stud in a boss. Selected studs of a shoe, preferably those to be located closer to the center of the tire tread, can be provided with tungsten carbide tips. A preferred range of dimensions for the shoes, studs and bosses is given.

13 Claims, 3 Drawing Figures

REMOVABLE, NON-SKID TIRE FITTING

The present invention relates to a non-skid fitting of plastic material in which studs are molded, and which is designed to be attached to tires for use during periods of snow or ice glaze. This fitting is composed of a series of shoes which can be of various forms, and usually have 2, 3 or 4 straps each. These shoes have the common feature of being identical and joined to one another by two longitudinal elements such as chains or cables.

Shoes of this general type are described in French Pat. Nos. 73-28,094 of July 20, 1973 (Publication No. 2,313,220); 74-19,642 of May 30, 1974 (Publication No. 2,278,513); 77-06,670 of Feb. 28, 1977 (Publication No. 2.372,041) of the applicant.

Since the appearance of the automobile, various inventions have been proposed as attempts to successfully combat the difficulties encountered by the motorist travelling in the winter. Studded tires, or the like, have had some success in this field for the past fifteen years or so. But it is impossible to ignore the fact that these tires cause considerable damage to the roadways. This is why, in recent years, some countries have prohibited the use of studded tires, while others passed laws restricting their use to specific times or imposing certain limitations on the studs themselves.

Because of this, interest has shifted to removable devices which are placed on the tire in case of snow or ice glaze, and removed when the roadway is normal. The general type of removable non-skid fittings to which the subject invention relates are more flexible and more reliable than the traditional skid-chains. However, they have two drawbacks - they are expensive and do not last very long.

It is an object of the present invention to provide a solution to these drawbacks. Accordingly, the invention has as as an object a removable non-skid fitting having shoes of plastic material, which are provided with bosses holding studs, in which the studs are formed by cylinders of tempered steel with a diameter on the order of 4 to 6 mm. The studs are enclosed in the bosses and have at their bases a retention flange with rounded edges, the thickness of the sole of the shoe between the retention flange and the tire being more than 3.5 mm, and the diameter of the base flange being about 12 to 14 mm.

It has been found that such studs provide excellent results, but that their useful life varies under different conditions. The base flange of the studs are preferably made smooth and round. Otherwise, the sole is punctured along the perimeter of the base flange, at a rate directly proportional to the sharpness of the edges of the flange.

Other objects and advantages of the invention, are described below with reference to the attached drawing in which.

Figure 2:
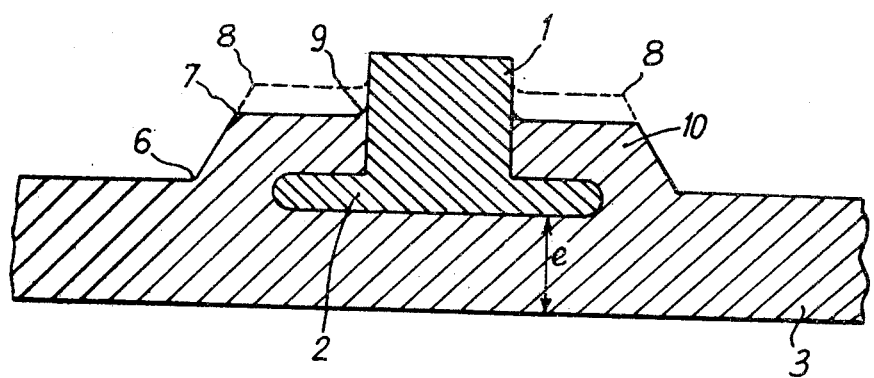
FIG. 2 is a sectional view of a first embodiment of the device.
Figure 3:
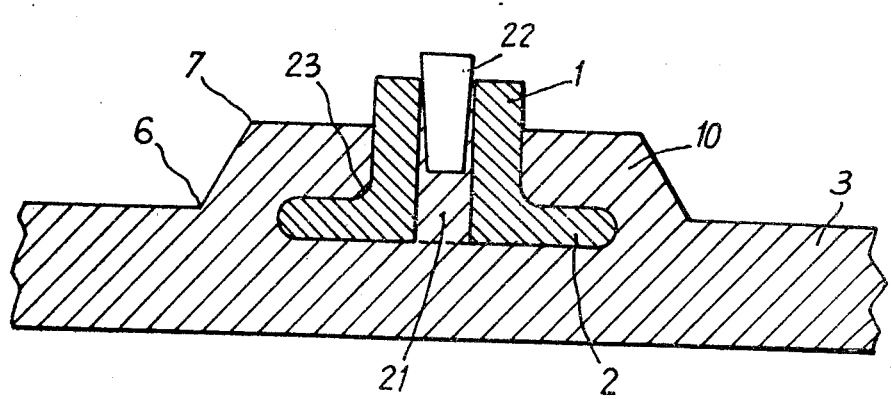
FIG. 3 is a sectional view of an alternative to FIG. 2.

In the drawings, FIGS. 2 and 3 are on an enlarged scale, in the order of 4 to 1.

As seen in the drawings, the stud 1 is a cylinder of tempered steel, terminating in a seat in the form of a flange 2, which is embedded in a boss 10 formed in a shoe 3. According to FIG. 1, shoe 3 has a Y shape formed effectively by three straps 13. Links of longitudinal chains 16 are attached to the terminal ends of the straps, a first chain attached to the base leg of the Y and a second chain to the other two legs. The removable non-skid device is formed by the chains 16 on which several of the shoes 3 are fixed, as described in the above-mentioned patents. Shoes 3 are of plastic material, such as, for example, polyurethene.

As mentioned above, the thickness e of the sole portion of shoe 3 under flange 2 is preferably at least equal to about 3.5 mm. The diameter of flange 2 of the stud 1 is preferably about 12 to 14 mm, and the flange has rounded edges. The shaft portion of stud 1 extending above the flange 2 has a diameter in the range of from about 4 to 6 mm, and this diameter is preferably about 6 mm.

The thickness e of 3.5 mm between the bottom of the flange and the bottom of the sole is a minimum. The preferred thickness is in the range of 5 mm, and less than 6 mm.

The metal of the stud 1 wears faster than the plastic material of shoe 3. Wear is also faster as the studs are closer to the center of the tread of the tire, i.e. substantially close to the middle of the shoes 3.

Figure 1:
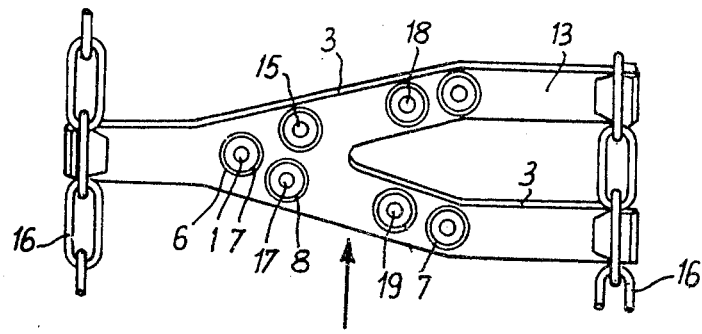
FIG. 1 is a plan view of a shoe for a non-skid fitting according to the invention.

In FIG. 1, the arrow represents the center of where the tire tread would be located when the shoe is fastened and the middle of the shoe 3, which is free of studs.

It has been found that studs located in the center of the tread not only wear, or are detached quickly, but in addition break up the roadway both on ice and on dry or set ground. To solve this problem, and since the thickness of the sole is preferably uniform, the invention provides a greater thickness, or height, for the bosses 10 of the studs which are closest to the middle of the shoe. This is shown by the dotted line 8 of FIG. 2. This has the effect, on the one hand, of reducing the protrusion of the studs, i.e. their height projected from the plastic, and on the other hand, reducing the area of the top surface of boss 10 which is in contact with the ground. When the bosses are frustoconical, the said top surface areas are that of the circles 7 or circles 8, according to whether outer bosses (circle 7), or those near the middle of the shoe (circle 8) are involved. This provides a compromise between the rates of wear of the plastic material and the stud.

Boss 10 is preferably frustoconical as represented, but can have some other shape than that of a truncated cone or pyramid, for example, that of a cube or a cylinder. It is preferable that the rate of wear be a function of the rate of wear of the lateral studs.

The thickness, or height, of the bosses 10 is preferably on the order of 4.5 mm and should not be below 3.5 mm, and the length of the shaft of the stud is in the range of from about 4 to 6 mm, and preferably 5 mm. The protruding height of the heads of the studs will then be in the range of from about 2 mm to 3 mm, allowing for the thickness of the flange, in the range of from about 1.3 to 2 mm.

The overall thickness of the shoes preferably should not exceed 12 mm on the tread of the tire. Vibrations caused by running on dry ground occur if this thickness is exceeded.

The device as a whole should be able to slip easily over the tire as it is being installed in order to facilitate installation. However, it also must be formed so that in cases of sudden braking, inversion of a strap 13, or a shoe, is avoided as well as detachment of a stud. As a result, the sole portion 3 of the shoe (FIGS. 1 and 2) in contact with the tire, should be smooth, or at the very most, slightly rough, and must not have any molded profile causing the shoe to catch on the tire.

Since the studs 1 are formed by cold stamping (the least expensive method) from a rod of constant diameter, the body of the stud is preferably cylindrical. The result is a process of trial and error, and hence a loss of time, in the insertion of the studs in each cavity of the bosses of the shoe. To obviate this drawback it is necessary to provide, in the shoe, for each stud either a small groove, or to make the cavities of the bosses of a larger diameter.

The result in the first case is a small ring of plastic material 9 (FIG. 2) surrounding the stud, and forming a part of the boss 10. In the second case, a very thin collar of plastic material is formed surrounding the same stud.

The shoes must be as narrow as possible in order to increase the pressure in contact with the ground, and to enable them to penetrate better into the ground, without, however, either compromising their solidity or facilitating their inversion when braking.

Therefore, a shoe in the form of a "Y" as represented in FIG. 1, should not have, on its outer face, any superstructure of a molded profile other than the bosses holding the studs, because these profiles would interfere with the bearing surface of the studs. Only a roughening of the shoe to prevent slipping should be provided between the stud-holding bosses.

The width of the straps 13 (FIG. 1) of the shoes, at the point where the studs are implanted, should be as narrow as possible, in order to increase the pressure transmitted by the weight of the vehicle to the shoes in contact with the ground, and hence enable the shoes to penetrate better into packed snow.

Furthermore, the plastic material used (polyurethane) is relatively expensive. The maximum efficiency should be sought for a minimum of material used.

The width for the shoe straps should be close to that of the bosses 10, both being between about 18 and 24 mm for passenger cars, and trucks up to about 3.5 tons, in order to have both a good retention of the studs, and better efficiency of the shoes in packed snow. The preferred width for the straps 13 and the bosses 10 is in the range of about 22 or 23 millimeters for each of the straps 13 (FIG. 1), separated from one another, that is the arms of the Y, and tending toward twice this width at the point where the studs 15 or 17 are side by side, in the case where two straps come together.

If the shoes have the form of an X or a Y, the straps will come together. At their junction point it is desirable to have, not an acute, but a rounded angle, as shown in FIG. 1. This avoids premature tearing, when in use, of the plastic material at the junction point of the straps.

As indicated above, the thickness of the sole, between the heads 2 of the studs 1 and the tire, should be at least about 3.5 millimeters, and a properly made device should have a sole thickness of 4 to 6 mm. Otherwise the sole will break prematurely at the position of the studs.

Furthermore, to permit better traction to the shoes in snow, it is desirable to use a sole having a thickness of 5 to 6 millimeters uniformly throughout the shoe. It is then possible to increase the holding force of the implantation of the studs, by reducing the thickness of the sole by 0.5 to 1 mm just between the flange and the tire. Thus, in FIG. 2, reproduced on an enlarged scale of 4X, this thickness e was reduced to 4 millimeters, while that of the sole 3 amounts to 5 mm. The stud 1 is thus held on the shoe, not only by the shoe boss 10, but also by its flange 2 embedded on the shoe.

The following table summarizes the dimensional data set forth above:

| Dimensions (in mm) | Minimum | Maximum | Preferred |
|---|---|---|---|
| Studs | | | |
| Length of shaft | 4 | 6 | 5 |
| Diameter of shaft | 4 | 6 | 6 |
| Diameter of flange | 12 | 14 | 14 |
| Thickness of flange | 1.3 | 2 | 1.5 |
| Plastic Material | | | |
| Thickness of sole: | | | |
| (a) Under flanges | 3.5 | 6 | 5 |
| (b) Outside flanges | 5 | 6 | — |
| Width of straps at studs: | | | |
| (a) Straps separated from one another | 18 | 24 | 22 |
| (b) At junction of straps | 36 | 46 | 44 |
| Bosses | | | |
| (a) Diameter at base | 18 | 24 | 22 |
| (b) Thickness | 3.5 | 6 | 4.5 |

In the embodiment of FIG. 3, a tungsten carbide tip 22 is fixed in the upper, protuberant part of the stud 1, which is hollowed out at 21. Tip 22 can be slightly conical in shape and inserted by force, its bottom and top diameters being on the order of 2 and 2.5 mm.

This embodiment has various advantages. In snow, whether fresh or packed, steel studs of large diameter (e.g. 6 mm) permit better traction than thinner studs, such as the known studs of tungsten carbide (e.g. diameter about 2.5 mm). When conditions are icy, the steel studs grip very effectively in the icy irregularities of a road. But the hard face of the roadway quickly dulls even tempered steel studs. This is particularly true for the studs closest to the center of the tire tread, i.e. the center of the shoes. Such studs, after travelling 120 to 150 km on dry ground, lose some of their effectiveness, particularly on ice glaze. It is difficult to replace the small tungsten carbide studs which are the most resistant to wear, and penetrate better into the ground.

As shown in FIG. 3, the steel stud shaft protrudes from boss 10. A preferred distance is about 2 mm. The carbide tip 22 projects beyond stud 1 by about 1 mm. Since tungsten carbide is expensive, it is preferable not to tip all the steel studs with a hard tungsten carbide core. Only the fastest-wearing steel studs, i.e. the studs closest to the center of the tire tread or, in FIG. 1, studs 15, 17, 18 and 19, are so tipped. The other studs would be in accordance with FIG. 2.

Thus, on the same shoe, there is a mixture of studs of steel and of steel tipped with tungsten carbide. The latter studs have a double effect, the effect of the fine carbide stud at the head, and the effect of the coarse steel stud supporting it.

To increase the strength of the walls of stud 1 and its flange 2 (FIG. 3), it is advisable to provide a rounding 23, all around the shaft, at the point where the shaft joins the flange 2.

While there have been described what are considered to be the preferred embodiments of the invention, it will be obvious to those skilled in the art that various changes and modifications may be made therein without departing from the invention, and it is, therefore, aimed to cover all such changes and modifications as falls within the true spirit and scope of the invention.

The embodiments of the invention in which an exclusive property or privilege is claimed are defined as follows:

1. A removable, non-skid fitting for a tire comprising:
   a shoe of flexible plastic material, said shoe formed with a sole portion having a lower surface which is to be placed adjacent the tire and having an upper surface, the distance between said upper and lower surfaces being in the range of from about 5 mm to about 6 mm,
   a plurality of bosses on said shoe extending from said upper surface of said sole,
   a stud for a said boss, each of said studs having a substantially circular base flange with a diameter in the range of from about 12 mm to about 14 mm with rounded edges and a generally cylindrical extending shaft with a length of from about 4 mm to about 6 mm, said base flange and a part of the extending shaft of a stud being held within a corresponding boss with a part of the shaft extending above the top surface of its boss, the thickness of the sole between the lower face of a stud base flange lower face and the lower surface of the sole being at least about 3.5 mm and the diameter of a boss at its base on the upper surface of the sole being greater than the diameter of the base flange of a stud.

2. A fitting according to claim 15 wherein the bosses have a greater height above the top surface of the sole in the region of the middle of the sole than on the edges thereof.

3. A fitting according to claim 1 wherein the height of the bosses above the top surface of the sole is greater than 3.5 mm.

4. A fitting according to claim 3 wherein the height of the bosses is about 4.5 mm.

5. A fitting according to claim 1 wherein the height of protrusion of the shafts of the studs beyond the bosses is in the range of from about 2 mm to about 3 mm.

6. A fitting according to claim 1 wherein the thickness of the base flange of the studs is in the range of from about 1.3 mm to about 2 mm, and the length of the shafts of the studs is in the range of from about 4 mm to about 6 mm.

7. A fitting according to claim 1 wherein the distance between the top surface of the sole and the top of a stud base flange is approximately about 0.5 mm to about 1.0 mm.

8. A fitting according to claim 1 wherein the bosses have the shape of a truncated cone.

9. A fitting according to claim 1 wherein the width of the base of the bosses is in the range of from about 18 mm to about 24 mm.

10. A fitting according to claim 1 wherein the shoe has a first arm from which branch out a pair of second arms, each of said arms having a sole and extending bosses, the width of a second arm being substantially equal to that of the bases of the bosses thereon, the width of the first arm being substantially twice the width of a second arm and in an area having two adjacent bosses located across the width of said first arm.

11. A fitting according to claim 1 wherein the shafts of at least some of the studs have tips of tungsten carbide.

12. A fitting according to claim 12 wherein the tungsten carbide tips project beyond the face of the studs by about 1 mm.

13. A fitting according to claim 12 wherein both studs without tungsten carbide tips and studs with tips of tungsten carbide are provided on said fitting, the latter being placed closer to the middle of the shoe.

* * * * *

UNITED STATES PATENT AND TRADEMARK OFFICE
CERTIFICATE OF CORRECTION

PATENT NO. : 4,262,723
DATED : April 21, 1981
INVENTOR(S) : Bourcier De Carbon De Previnquieres It is certified that error appears in the above-identified patent and that said Letters Patent are hereby corrected as shown below:

On the title page, Item [76] "Bourcier de Caron de Previnquieres" should read

--- BOURCIER DE CARBON DE PREVINQUIERES ---

Signed and Sealed this

Twenty-fifth Day of August 1981

[SEAL]

Attest:

GERALD J. MOSSINGHOFF

Attesting Officer

Commissioner of Patents and Trademarks